United States Patent [19]

Major et al.

[11] Patent Number: 5,218,834
[45] Date of Patent: Jun. 15, 1993

[54] STORAGE CONTAINER FOR RECOVERED REFRIGERANT

[76] Inventors: Thomas O. Major, 4105 Gray, Denver, Colo. 80212; Jack E. Major, Jr., 1590 Harlan, Lakewood, Colo. 80214

[21] Appl. No.: 850,766

[22] Filed: Mar. 13, 1992

[51] Int. Cl.⁵ ............................................. G01K 13/00
[52] U.S. Cl. ........................................ 62/129; 62/149; 374/150; 374/143
[58] Field of Search .................. 62/129, 125, 126, 127, 62/149, 195, 85; 220/DIG. 16; 73/756; 374/143, 150, 161, 162; 215/230, 228, 365

[56] References Cited

U.S. PATENT DOCUMENTS

| | | | |
|---|---|---|---|
| 1,917,810 | 7/1933 | Reynoldson | 374/143 X |
| 2,202,010 | 5/1940 | Kondolf | 62/125 X |
| 2,324,627 | 7/1943 | Jones | 62/127 X |
| 2,475,218 | 7/1949 | Campbell | 62/195 X |
| 2,896,420 | 7/1959 | Smouse | 62/125 |
| 3,052,101 | 9/1962 | Bishop | 62/125 X |
| 3,864,976 | 2/1975 | Parker | 374/150 X |
| 4,515,019 | 5/1985 | Woodfill | 73/756 |
| 5,063,749 | 11/1991 | Manz | 62/149 |
| 5,121,637 | 6/1992 | Philipp et al. | 73/756 X |
| 5,127,232 | 7/1992 | Paige et al. | 62/149 X |

Primary Examiner—Harry B. Tanner
Attorney, Agent, or Firm—J. Preston Oxenham

[57] ABSTRACT

A refrigerant storage container includes a temperature indicator to indicate the temperature of fluid in the container, a pressure gauge for indicating the pressure of the contained fluid and a temperature indexed vapor pressure scale on the face of the gauge. Another embodiment includes a thermal strip on the outside wall of the container which indicates a target pressure for a pure refrigerant contained therein. A third embodiment includes a temperature indicator, pressure gauge and a temperature pressure chart on an exterior wall of the container.

12 Claims, 4 Drawing Sheets

| PSI | R12 | R500 | R22 | R502 |
|-----|-----|------|-----|------|
|     |     | TEMPERATURE | | |
| 58  | 60  | 50   | 32  | 24   |
| 60  | 62  | 52   | 34  | 26   |
| 62  | 64  | 54   | 35  | 28   |
| 64  | 65  | 55   | 37  | 29   |
| 66  | 67  | 57   | 38  | 30   |
| 68  | 68  | 58   | 40  | 32   |
| 70  | 70  | 60   | 41  | 33   |
| 75  | 74  | 63   | 44  | 36   |
| 80  | 77  | 66   | 47  | 40   |
| 85  | 81  | 70   | 51  | 43   |
| 90  | 84  | 73   | 53  | 46   |
| 95  | 87  | 76   | 56  | 49   |
| 100 | 90  | 79   | 59  | 51   |
| 105 | 93  | 82   | 62  | 54   |
| 110 | 96  | 84   | 64  | 57   |
| 115 | 99  | 87   | 67  | 59   |
| 120 | 102 | 90   | 69  | 62   |
| 125 | 107 | 92   | 72  | 64   |
| 130 | 109 | 95   | 74  | 67   |
| 135 | 112 | 97   | 76  | 69   |
| 140 | 114 | 99   | 78  | 71   |
| 145 | 117 | 102  | 81  | 73   |
| 150 | 119 | 104  | 83  | 75   |
| 155 | 121 | 106  | 85  | 77   |
| 160 | 123 | 108  | 87  | 80   |

FIG. 4

STORAGE CONTAINER FOR RECOVERED REFRIGERANT

TECHNICAL FIELD

The present invention relates to the purification and storage of used refrigerants recovered from refrigerant charged refrigeration systems. More particularly, the present invention relates to the purging of incompressible gaseous contaminants from stored refrigerant recovered from a refrigeration system prior to repair or replacement of the system, before the refrigerant is reused.

BACKGROUND OF THE INVENTION

Traditionally, when refrigerant charged refrigeration systems were repaired, the refrigerant charge was simply loosed to the atmosphere as necessary to accomplish the repairs. In recent times, it has become increasingly desirable to capture and reuse the refrigerant charge in these units for two reasons; refrigerant pollution of the atmosphere is perceived as environmentally destructive and the cost of refrigerant materials has increased making the disposal and replacement of a refrigerant charge increasingly unacceptable and costly.

Refrigerant recovery devices are known in the art which compress and cool refrigerant taken from a charged refrigeration system to a liquid state for storage in a refrigerant storage container and later reintroduction to the same refrigeration system after repair has been accomplished or for use in another system. Many of these recovery systems filter the refrigerant during the removal-compression-cooling process to remove contaminants from the recovered refrigerant before it is introduced into a storage container. However, these devices typically have not provided for effective removal of "incompressible" gas contaminants, i.e. gasses much less compressible than the refrigerant, such as air, from the used refrigerant during the recovery process before it is introduced into a storage container. Thus, incompressible contaminate gases frequently remain in solution in the liquid phase refrigerant when it is introduced into the storage container and must be purged off from the storage container over time using a time-temperature-pressure method to make the recovered refrigerant acceptable for reuse.

A frequently used method for purging incompressible contaminants from recovered refrigerant is well known, and Underwriters Laboratories, Inc. requires that a description of the method and vapor-pressure-temperature charts for various common refrigerants required to implement it, be provided in operator manuals for recovery equipment certified by it. Generally, the method of purging incompressible contaminant gases from a known type of refrigerant in a storage container involves the steps of determining the temperature of the stored refrigerant, measuring the pressure of the refrigerant in the container and comparing that pressure to a pressure determined from a temperature-vapor-pressure chart for pure refrigerant of that type. If the pressure of the refrigerant in the container is significantly higher than the pressure shown on the chart for pure refrigerant of that type at that temperature, for example, five psi. higher, the storage tank is briefly vented at the top to release lighter incompressible gasses which have accumulated in the top of the container. For example, a 50 pound storage container may be vented for about five seconds. After venting, the storage vessel may be tamped to accelerate the release of incompressible contaminants from dissolution in the liquid phase stored refrigerant. The storage vessel is then allowed to stand for a period of time, and the process is repeated until the pressure is within an acceptable range of that of pure refrigerant at the determined temperature.

During the process, the pressure of the stored refrigerant may be determined by attaching a pressure gauge to the storage tank. Alternatively, in the case of refrigerant recovery machinery provided with a gauge indicating the pressure of refrigerant at the outlet by which the machine is connected to a storage tank, the tank may be left connected, or may be reconnected, to the refrigerant recovery device and the pressure determined from that gauge.

Heretofore, the temperature of refrigerant within the storage container has been determined in a number of ways. Some refrigerant recovery machines of the prior art are equipped with temperature gages indicating the temperature of refrigerant gas in the machine at a point proximate to the outlet pressure gauge discussed above. Generally, however, recovery machines are attached to a storage vessel by a length of tube or hose, and the temperature at such a temperature gauge will not accurately reflect that of refrigerant in the storage container. Further, as in the case of using recovery machine gauges to measure pressure of refrigerant in the container, this method requires the availability of the recovery machine, tieing-up a machine which might otherwise be profitably employed in recovery operations. Alternatively, the storage container may be left to stand for a period of time after filling, and, the refrigerant then assumed to be at ambient temperature. This method requires a storage location with a known and constant ambient temperature, and, a substantial period of time may be required for the refrigerant in the storage vessel to cool to ambient temperature after being filled by a refrigerant recovery machinery. Also, hand-held temperature sensing devices such as, for example, digital pyrometers, have been utilized to measure the temperature of stored recovered refrigerant by bringing a temperature-sensing of stored recovered refrigerant by bringing a temperature-sensing probe into contact with the storage tank to determine its temperature. This method requires the inconvenience, expense and maintenance of an additional tool.

Temperature-pressure charts from which a vapor pressure corresponding to refrigerant temperature may be determined for various types of pure refrigerant are generally provided in operator manuals for refrigeration recovery machinery or on cards to be carried by machine operators. Thus, an operator manual or vapor-pressure-temperature chart card must be made available at the location of the storage container.

DISCLOSURE OF THE INVENTION

It is an object of the present invention to provide a storage container for recovered refrigerant which will facilitate detection and purging of incompressible gas contaminants present in recovered refrigerant stored in the container.

It is an object of the present invention to provide a storage container for recovered refrigerant which will facilitate detection and purging of incompressible gas contaminants in recovered refrigerant stored in the container with no requirement for additional tools or instruments.

It is a further object to provide such a container which is as durable as those of the prior art.

It is also an object to provide such a container which may be handled in the same manner and stored in the same space as containers of the prior art.

It is also an object to provide such a container which can be manufactured for little or no additional cost than a container of the prior art.

A container for recovered refrigerant comprising a preferred embodiment of the present invention includes a conventional canister body like those of refrigerant storage cylinders of the prior art. A thermal strip, panels of which change color to indicate the temperature of the strip, is attached in thermal communication to a lower portion of the outside wall of the canister body. A screw cap for the container is provided with a pressure gauge such that, when the cap is screwed onto a fitting at the top of the container, the gauge indicates the pressure of the container contents. The gauge face is provided with scales indicating temperatures which correspond to vapor pressures of selected unique pure refrigerants as shown on a pressure scale on the gauge face. Thus, during a purging process for removing incompressible contaminates from refrigerant contained in the container, a temperature indicated by the thermal strip can be observed and the target vapor pressure of a pure refrigerant of the type contained in the container which corresponds to that temperature noted on the gauge face. If the actual pressure indicated by the gauge is significantly higher than that pressure, the container can be vented at the top by loosening the screw cap.

In an alternative embodiment, a vapor-pressure-temperature chart is provided on the outside wall of the container from which a target pressure can be determined after the temperature indicated by the thermal strip is noted. That pressure then can be compared to the pressure of the container contents as indicated by a pressure gauge of a recovery machine attached to the refrigerant container or a gauge mounted directly on the storage container.

In a third embodiment, thermal strips are utilized which directly indicate a target vapor pressure for a given refrigerant, eliminating the need for vapor pressure charts or gauge scales.

Other objects, advantages and aspects of the invention will become apparent upon reading of the following detailed description and claims and upon reference to the accompanying drawings.

BRIEF DESCRIPTION OF THE DRAWINGS

FIG. 4 is an enlarged view of the vapor-pressure-temperature chart of the alternative embodiment.

DETAILED DESCRIPTION OF THE INVENTION

Figure 1:
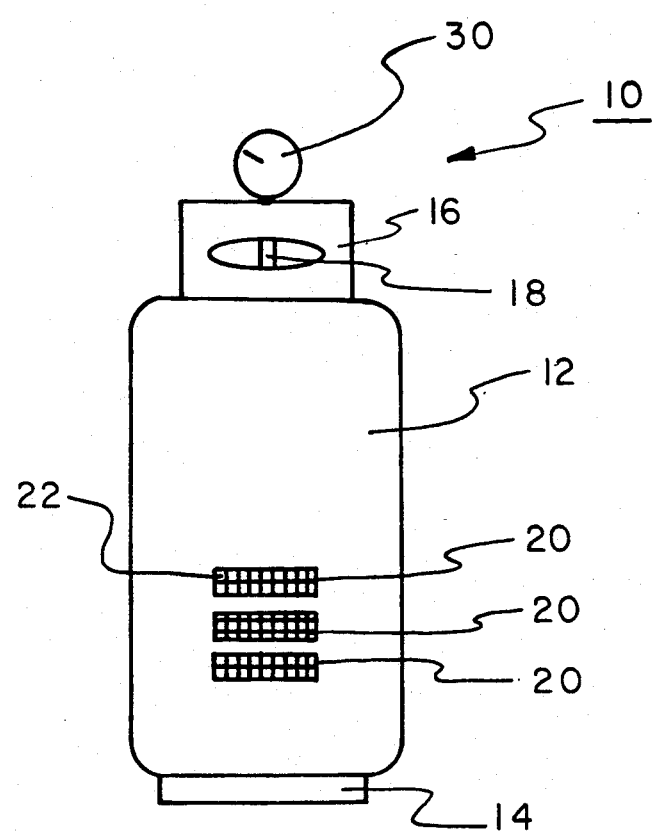
FIG. 1 is a front elevation view of a refrigerant storage tank comprising a preferred embodiment of the present invention.

A container for containing recovered refrigerant comprising a preferred embodiment of the present invention is shown in FIG. 1. In accordance with the invention, recovered refrigerant container 10 includes a conventional canister body 12 like those of refrigerant storage cylinders of the prior art. Canister body 12 of the preferred embodiment is made of a material of suitable thermal conductivity and strength, for example, metal, and is provided with base 14, to improve stability of the container when standing in an upright position. Threaded fitting 18 is provided at the top of canister body 12 for attaching hoses to refrigerant recovery machines and the like and is protected by protective shroud 16.

Thermal strips 20, such as are manufactured and sold by Hallcrest, Inc., are attached in thermal contact on the outside wall of canister body 12. Thermal strips 20 may be provided with an adhesive backing to facilitate attachment to canister body 12 during manufacture, or may be attached to the wall of canister body 12 by means of any of a large number of commercially available adhesives applied sufficiently thinly to assure the strip is at the same temperature as the wall of canister body 12. Thermal strips 20 are attached close to the bottom of canister body 12 to help in assuring thermal strips 20 are in contact with the wall directly opposite any liquid phase refrigerant which may be in the bottom of container 10 to assure accurate measurement of the temperature of the refrigerant.

Thermal strips 20 have individual panels 22 which change color in response to temperature. Generally, one of panels 22, each of which is sensitive to a temperature range of only 1 or 2 degrees Fahrenheit, is activated to appear of a color different from all other panels 22 on strip 20 when the strip is at a temperature within the temperature indication range of strip 20, typically about 30° F. Each of panels 22 may also exhibit more that a single color change over its narrow sensing range to provide further resolution of temperature determination. Individual panels 22 of strip 20 may have numbers printed on them corresponding to the range to which the individual panel is sensitive to assist in interpreting the temperature sensed as indicated by the panel which is of different color and the color to which it has changed. A number of strips, each having a different temperature sensing range, for example, 25°-56° F., 58°-88° F. and 90°-120° F., may be utilized to provide temperature indication over a sufficiently broad range of temperature.

Figure 2:
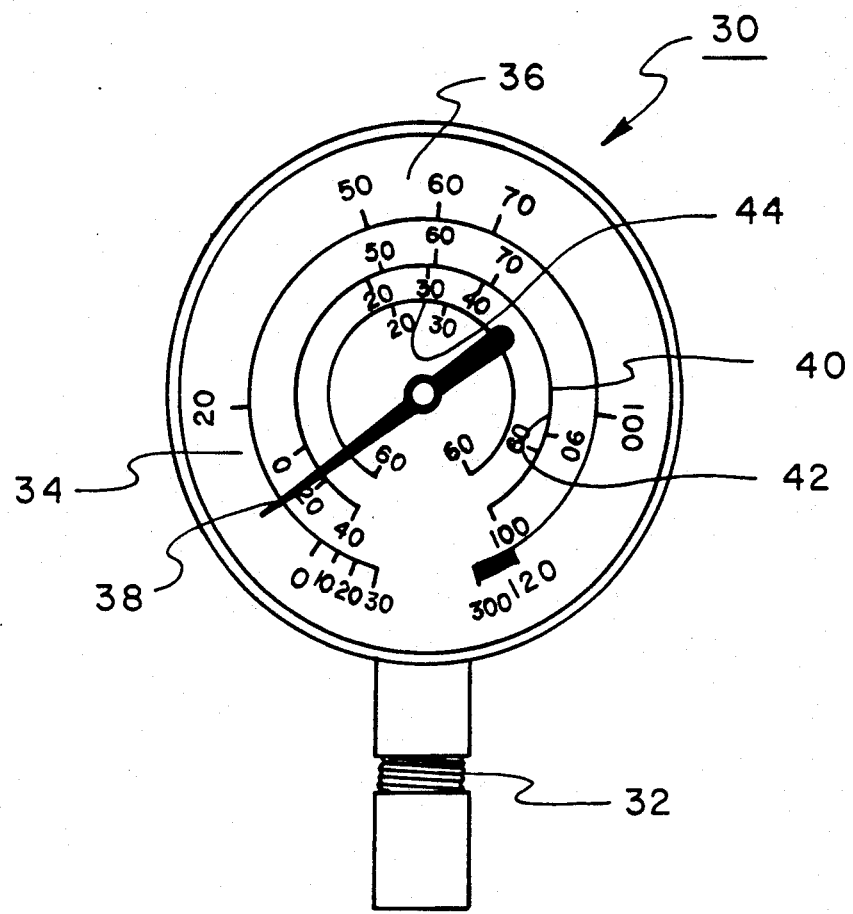
FIG. 2 is an enlarged view of the face of the pressure gauge of the preferred embodiment.

Recovered refrigerant container 10 includes pressure gauge 30 mounted upon a threaded cap 32 which may be threaded onto threaded fitting 18 to measure the pressure of refrigerant contained within container 10. As may best be seen in the enlarged view of FIG. 2, face 34 of pressured gauge 30 includes pressure scale 36 for indicating pressure within container 10 in cooperation with pressure indicating needle 38, and temperature indexed scales 40, 42 and 44 which may be utilized in cooperation with pressure scale 36 to determine target vapor pressure for specific pure refrigerants, for example, R12, R22 and R502 refrigerant, respectively, corresponding to a temperature as determined from thermal strips 20. If the pressure indicated by needle 38 is too high, cap 32 may be loosened by turning gauge 30 to vent incompressible gasses from the top of container 10.

Figure 3:
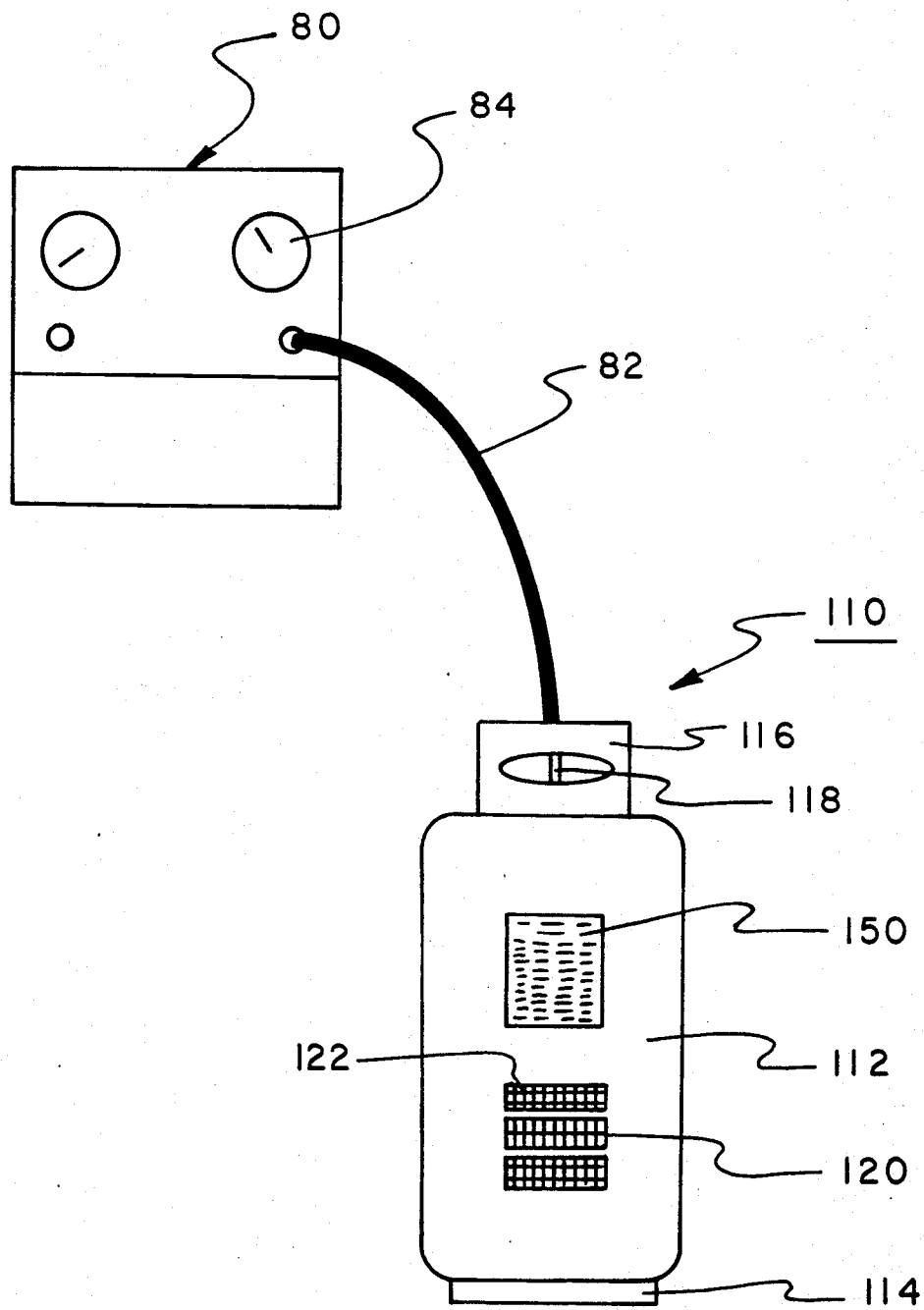
FIG. 3 is a schematic elevation view of a refrigerant storage tank comprising an alternative embodiment of the present invention connected to a refrigerant recovery machine.

An alternative embodiment of the present invention is shown in FIG. 3. In that figure, container 110 comprising an alternative embodiment of the present invention is attached to an outlet of refrigerant recovery machine 80 by hose 82 attached to threaded fitting 118. Canister body 112 of container 110 is provided with base 114 and protective shroud 116. Thermal strips 120 including thermal strip panels 122 are attached in thermal communication to the lower portion of the wall of Canister body 112. Vapor pressure chart 150, as best seen in the enlarged view of FIG. 4, is printed on the wall of Canister body 112. Chart 150 includes four columns listing temperatures corresponding to vapor pressures listed in the far left column for R12, R500, R22 and R502 refrigerant respectively. Thus, after noting the temperature indicated by thermal strips 20, the target vapor pressure for a known refrigerant may be determined from chart 150. An operator of recovery machine 80 may then compare the target pressure to the pressure reading of outlet port pressure gauge 84 to determine if refrigerant in container 110 is contaminated to incompressible gasses.

The need to use vapor pressure scales 40, 42 and 44 on gauge face 34 or to use vapor pressure chart 150 to determine target vapor pressure can be eliminated by substituting numerals indicative of the vapor pressure for a particular refrigerant on panels 22 of thermal strips 20 corresponding to the temperature at which each panel is activated for numerals indicative of the temperature such that target vapor pressure may be determined directly from examination of thermal strip 20. Multiple sets of strips may be utilized to provide for use of container 10 with more than one type of refrigerant.

While an exemplary storage container for recovered refrigerant comprising a preferred embodiment of the present invention has been shown, it will be understood, of course, that the invention is not limited to that embodiment. Modification may be made by those skilled in the art, particularly in light of the foregoing teachings. It is, therefore, contemplated by the appended claims to cover any such modification which incorporates the essential features of this invention or which encompasses the spirit and scope of the invention.

We claim:

1. A refrigerant storage container for containing refrigerant comprising:
    vessel means for containing fluid,
    temperature indicating means for indicating the temperature of fluid contained within said vessel means;
    pressure indicating means for indicating the pressure of fluid contained within said vessel means; and,
    means for determining a pressure representative of a vapor pressure of pure refrigerant at a temperature.

2. A refrigerant container as in claim 1, in which said temperature indicating means includes a thermal strip attached in thermal communication to an outside wall of said vessel means.

3. A refrigerant container as in claim 2, in which said thermal strip is attached to a lower portion of said wall.

4. A refrigerant container as in claim 1, in which said temperature indicating means is a thermal strip attached in thermal communication to an outside wall of said vessel means and said means for determining a pressure representative of a vapor pressure of pure refrigerant at a temperature is a temperature-pressure chart on an exterior wall of said vessel means.

5. A refrigerant container as in claim 1, in which said pressure indicating means is a pressure gauge mounted on a removable cap of said vessel means.

6. A refrigerant container as in claim 1, in which said pressure indicating means is a pressure gauge and said means for determining a pressure representative of a vapor pressure is a temperature indexed scale on a face of said pressure gauge.

7. A refrigerant storage container for containing refrigerant comprising:
    vessel means for containing a fluid; and,
    target pressure indicating means for indicating a pressure representative of a vapor pressure of pure refrigerant at a temperature of fluid contained within said vessel means.

8. A refrigerant container as in claim 7, in which said target pressure indicating means includes a thermal strip attached in thermal communication to an outside wall of said vessel means.

9. A refrigerant container as in claim 8, in which said target pressure indicating means is a thermal strip attached in thermal communication to an outside wall of said vessel means, said strip calibrated to indicate a target pressure of a pure refrigerant.

10. A refrigerant container as in claim 9, comprising a plurality of thermal strips attached in thermal communication to an outside wall of said vessel means, each strip calibrated to indicate a target pressure of a unique pure refrigerant.

11. A refrigerant storage container for containing refrigerant comprising:
    vessel means for containing fluid;
    a thermal strip attached in thermal communication to an outside wall of said vessel means or indicating the temperature of a fluid within said vessel means;
    a pressure gauge for indicating the pressure of fluid contained within said vessel means; and,
    a temperature-pressure chart on an exterior wall of said vessel means for determining a pressure representative of a vapor pressure of pure fluid at a temperature indicated by said thermal strip.

12. A refrigerant container as in claim 11, in which said pressure gauge is mounted on a removable cap of said vessel means.

* * * * *